(12) United States Patent
Garcia-Llama

(10) Patent No.: US 8,321,077 B1
(45) Date of Patent: Nov. 27, 2012

(54) ATTITUDE DETERMINATION WITH THREE-AXIS ACCELEROMETER FOR EMERGENCY ATMOSPHERIC ENTRY

(75) Inventor: Eduardo Garcia-Llama, Houston, TX (US)

(73) Assignee: GB Tech, Inc., Houston, TX (US)

( * ) Notice: Subject to any disclaimer, the term of this patent is extended or adjusted under 35 U.S.C. 154(b) by 385 days.

(21) Appl. No.: 12/799,047

(22) Filed: Apr. 16, 2010

Related U.S. Application Data

(60) Provisional application No. 61/212,996, filed on Apr. 17, 2009.

(51) Int. Cl.
*B64G 1/62* (2006.01)
(52) U.S. Cl. ............................ 701/13; 701/3; 244/159.1
(58) Field of Classification Search ................ 701/3, 13; 244/159.1, 158.9, 159.3
See application file for complete search history.

(56) References Cited

U.S. PATENT DOCUMENTS
6,895,314 B2 * 5/2005 Ailor et al. ...................... 701/13
* cited by examiner

*Primary Examiner* — Joseph Rocca
*Assistant Examiner* — Nicole Verley
(74) *Attorney, Agent, or Firm* — John R Casperson

(57) ABSTRACT

Two algorithms are disclosed that, with the use of a 3-axis accelerometer, will be able to determine the angles of attack, sideslip and roll of a capsule-type spacecraft prior to entry (at very high altitudes, where the atmospheric density is still very low) and during entry. The invention relates to emergency situations in which no reliable attitude and attitude rate are available. Provided that the spacecraft would not attempt a guided entry without reliable attitude information, the objective of the entry system in such case would be to attempt a safe ballistic entry. A ballistic entry requires three controlled phases to be executed in sequence: First, cancel initial rates in case the spacecraft is tumbling; second, maneuver the capsule to a heat-shield-forward attitude, preferably to the trim attitude, to counteract the heat rate and heat load build up; and third, impart a ballistic bank or roll rate to null the average lift vector in order to prevent prolonged lift down situations. Being able to know the attitude, hence the attitude rate, will allow the control system (nominal or backup, automatic or manual) to cancel any initial angular rates. Also, since a heat-shield forward attitude and the trim attitude can be specified in terms of the angles of attack and sideslip, being able to determine the current attitude in terms of these angles will allow the control system to maneuver the vehicle to the desired attitude. Finally, being able to determine the roll angle will allow for the control of the roll ballistic rate during entry.

9 Claims, 4 Drawing Sheets

ATTITUDE DETERMINATION WITH THREE-AXIS ACCELEROMETER FOR EMERGENCY ATMOSPHERIC ENTRY

CROSS REFERENCES TO RELATED APPLICATIONS

This application claims the benefit of U.S. Provisional Application No. 61/212,996 filed Apr. 17, 2009, the disclosure of which is herein incorporated by reference.

STATEMENT REGARDING FEDERALLY SPONSORED RESEARCH OR DEVELOPMENT

This invention was made with Government support under contract NNJ05HI05C awarded by NASA. The Government has certain rights in this invention.

FIELD OF THE INVENTION

In one aspect, this invention relates to a back up method and system for carrying out a safe emergency atmospheric entry of a blunt cone capsule type spacecraft.

BACKGROUND OF THE INVENTION

During a nominal space flight, that is, a flight without incidents, a spacecraft entering the atmosphere, in its return to Earth, will fly a guided trajectory. During the entry flight, the guidance logic of the spacecraft commands the appropriate attitude in order to meet all pre-mission established criteria on heat rate, heat load, and deceleration loads, and to meet the parachute deploy conditions on altitude and dynamic pressure at a specific geographic location.

In order to accomplish these requirements, the spacecraft must have a fully operational Guidance, Navigation and Control (GN&C) system. The navigation component of this system tells the spacecraft where it is and what its orientation (also called attitude) is at all times. The guidance component tells the spacecraft the attitude it must achieve; and the control component, comprised by the jets in the Reaction Control System (RCS), executes the commands coming from the guidance to achieve the commanded attitude.

A major software or hardware failure in any component of the GN&C system will make it impossible to fly a guided atmospheric entry. In such a case, the emergency entry system is invoked to safely fly what is called a ballistic entry. To achieve a safe ballistic entry, three control phases need to be executed sequentially: First, in case the spacecraft is tumbling, any initial rates must be canceled to prevent the spacecraft from entering the atmosphere in an adverse attitude; second, the spacecraft must be oriented such that the heat shield faces the incoming airflow (i.e., in a heat-shield-forward attitude) to counteract the heat rate buildup; and third, a bank or roll rate must be imparted to null the average lift vector in order to prevent prolonged lift down situations that would result in excessive deceleration loads on the crew.

One scenario in which a nominal guided entry would not be flown is that in which no reliable attitude or angular rate information is available from the navigation system. In that case, a backup navigation system would be invoked and an emergency ballistic entry would be flown subsequently. Flying an emergency ballistic entry with high probabilities of success requires the knowledge of attitude and attitude rate, especially if the spacecraft is tumbling due to a possible additional RCS failure.

The objective of the invention is to provide, with the use of a 3-axis accelerometer, the attitude of a blunt capsule type spacecraft with enough accuracy as to carry out a safe emergency ballistic atmospheric entry. Being able to know the attitude, hence the attitude rate, will allow the control system (be it nominal or backup, automatic or manual) to execute the three control phases required to achieve a safe emergency ballistic entry. The 3-axis accelerometer is an instrument that is present in the GN&C system of all spacecraft. However, it has never been proposed or conceived as an instrument to determine attitude.

SUMMARY OF THE INVENTION

Two embodiments of the invention comprise methods (termed herein Simple Method and Trim Method) capable of determining the attitude of a blunt capsule type spacecraft with the use of a 3-axis accelerometer during atmospheric flight.

Signals from the 3-axis accelerometer are processed in an on-board computer to estimate spacecraft attitude and change of attitude to provide signals for actuating the jets in the reaction control system.

In both methods, the attitude is provided in terms of the aerodynamic angles: angles of attack, sideslip and roll. These angles are provided with an accuracy that allows the accomplishment of a safe emergency ballistic atmospheric entry.

DETAILED DESCRIPTION OF THE INVENTION

Figure 1:
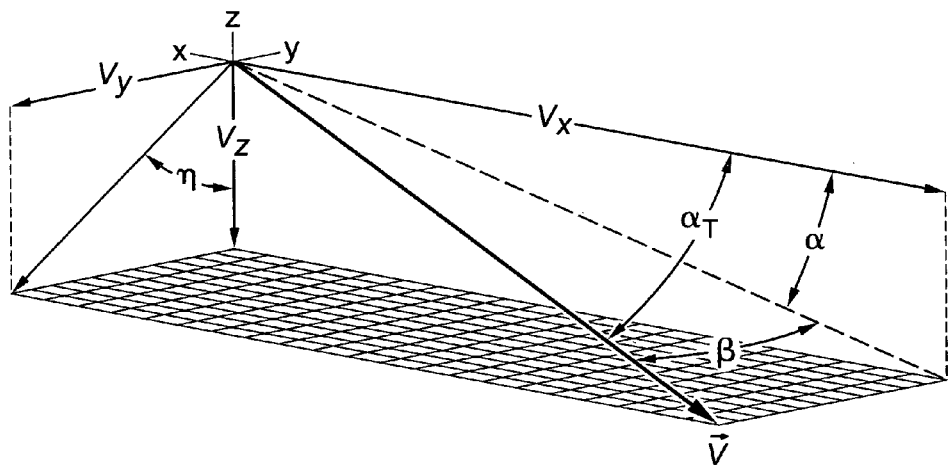
FIG. 1 graphically illustrates how the aerodynamic angles are defined. In this figure, $\alpha$ is the actual angle of attack, $\beta$ is the actual sideslip angle, $\eta$ is the actual roll angle, $\alpha_T$ is the actual total angle of attack; and $V_x$, $V_y$, and $V_z$ are the components of the velocity vector V.

The invention relates to a backup for a spacecraft navigation system that can be used to conduct a safe emergency ballistic atmospheric entry.

The backup system is provided in the form of a 3-axis accelerometer, a pair of algorithms either of which can be selected for use, and a processor running the selected algorithm so that the spacecraft attitude can be determined in terms of the aerodynamic angles (angles of attack, sideslip and roll) with enough accuracy as to attempt an emergency ballistic entry.

An emergency ballistic entry requires three phases to be executed in sequence:

First, in case the spacecraft is tumbling, any initial rates must be canceled. A tumbling motion can be originated by a stuck-on jet, for example, or by other RCS failure (in such a case, the spacecraft would disable the failing system and would enable a backup RCS system). Arresting a possible tumbling motion is necessary to prevent the spacecraft from entering the atmosphere in an adverse attitude. One such attitude is that with the apex pointing in the velocity vector (apex-forward attitude). In that attitude the heat rate build up would have fatal consequences because the apex of the spacecraft is practically thermally unprotected. This attitude is especially adverse in entry capsules with two aerodynamic trim angles of attack, as was the case in the Apollo spacecraft, which had a weak trim point close to the apex.

Second, the spacecraft must be oriented such that the heat shield faces the incoming airflow (i.e., in a heat-shield-forward attitude) to counteract the heat rate buildup.

And third, a bank or a roll rate must be imparted to null the average lift vector in order to prevent prolonged lift down situations that would result in excessive deceleration loads on the crew. The required bank or roll rate necessary to achieve a ballistic entry will be called ballistic rate.

Generally, during entry, it is also necessary to control the ballistic rate of the spacecraft. The unintended presence of even a small rolling moment (generated by a non-homogeneous ablation of the heat shield, or by protuberances in the spacecraft's outer skin) could decelerate the bank rate, resulting in lift down periods that could exceed crew safe limits, or could accelerate the bank rate, resulting in angular rates that could violate crew safe limits as well. Also, an excessive high ballistic rate could jeopardize the deployment of the landing system (drogue and main chutes) later in the flight.

One scenario in which a nominal guided entry would not be flown is that in which no reliable attitude or angular rate information is available from the navigation system. In that case, a backup navigation system would be invoked and an emergency ballistic entry would be flown subsequently. Flying an emergency ballistic entry with high probabilities of success requires the knowledge of attitude and attitude rate, especially if the spacecraft is tumbling due to a possible additional RCS failure.

Two methods are disclosed herein which can be used to find the attitude of the spacecraft through the use of a 3-axis accelerometer. Both methods provide the spacecraft attitude in terms of the aerodynamic angles. The first method is termed herein the Simple Method, and the second method is termed the Trim Method. The Simple Method does require minimum data processing whereas the Trim Method requires some more data processing. The Trim Method is the more accurate of the two.

The 3 axis accelerometer, which comprises three sensors having mutually orthogonally oriented axes, provides acceleration signals in each of its components. The acceleration signals are the result of the aerodynamic forces acting on the spacecraft at very high altitudes, where the atmospheric density is still very low. Current state of the art accelerometers can work with a resolution of 1 ng ($10^{-9}$ g) and even 0.1 ng ($10^{-10}$ g). (1 ng accelerometers are flown onboard the International Space Station) This resolution implies that accurate attitude information could be obtained from the accelerometer way before the actual start of the entry phase (usually at $5 \cdot 10^{-2}$ g) and, thus, way before the onset of high deceleration forces and heat rate levels that could be harmful to the crew if the spacecraft was in a non heat shield forward attitude.

The spacecraft control system comprises a system of jets for attitude control oriented to provide control capacity for the spacecraft in three mutually orthogonally oriented axes which may be the same as or different from the sensor axes.

Simple Method

Figure 2:
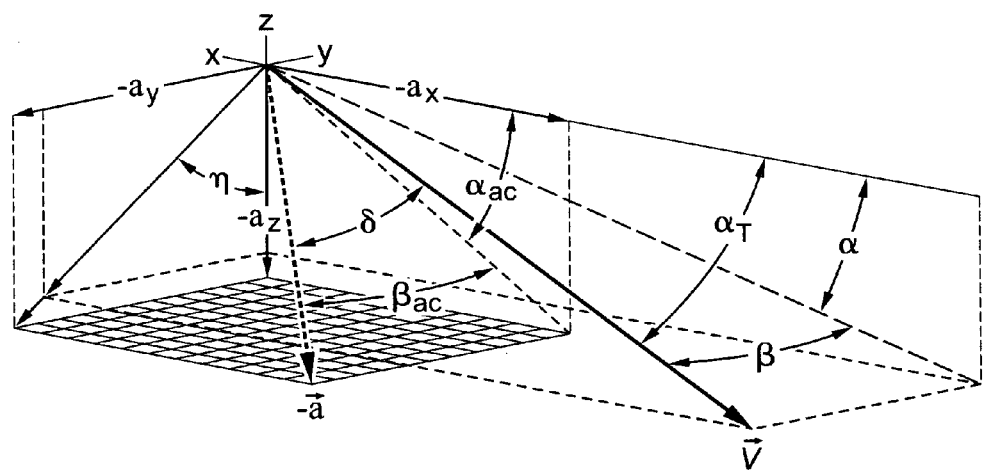
FIG. 2 graphically illustrates how a 3-axis accelerometer provides attitude information. In this figure, $\alpha$ is the actual angle of attack, $\beta$ is the actual sideslip angle, $\eta$ is the actual roll angle, $\alpha_T$ is the actual total angle of attack, $\delta$ is the angle between the minus acceleration vector (−a) and the velocity vector (V); $-a_x$, $-a_y$, and $-a_z$ are the components of the minus acceleration vector; and the angles $\alpha_{ac}$ and $\beta_{ac}$ are the resulting angle of attack and sideslip defined from the minus acceleration vector.

The actual aerodynamic angles (see FIG. 1) are defined in terms of the velocity components as $$\alpha = \tan^{-1}\left(\frac{V_z}{V_x}\right), \beta = \sin^{-1}\left(\frac{V_y}{\|\vec{V}\|}\right), \eta = \tan^{-1}\left(\frac{V_y}{V_z}\right) \quad \text{Eq. 1}$$

where $\alpha$, $\beta$ and $\eta$ are the actual angles of attack, sideslip and roll, respectively. With the Simple Method, the aerodynamic angles are calculated replacing the velocity components by the sensed acceleration components provided by the 3-axis accelerometer (see FIG. 2). Thus $$\alpha_{ac} = \tan^{-1}\left(\frac{-a_z}{-a_x}\right), \beta_{ac} = \sin^{-1}\left(\frac{-a_y}{\|\vec{a}\|}\right), \eta_{ac} = \tan^{-1}\left(\frac{-a_y}{-a_z}\right) \quad \text{Eq. 2}$$

where $\alpha_{ac}$, $\beta_{ac}$ and $\eta_{ac}$ are the angles of attack, sideslip and roll calculated from the acceleration signals $-a_x$, $-a_y$, and $-a_z$ provided by the 3-axis accelerometer.

Note that the angles generated by the 3-axis accelerometer can be differentiated to provide angular rates. This allows the damping of rates by the reaction control system.

Figure 3:
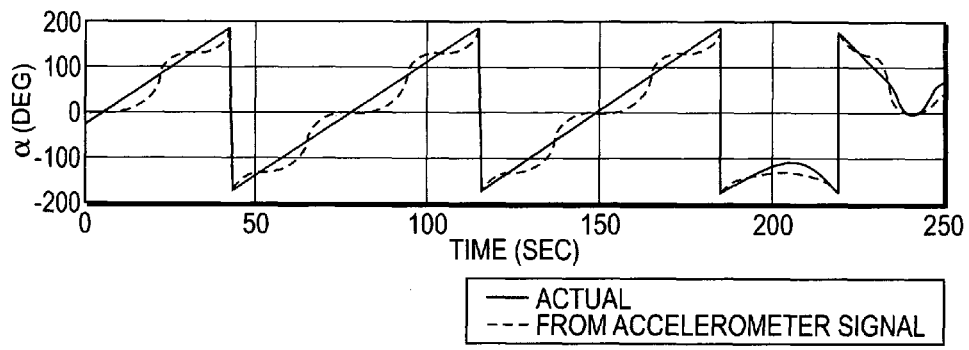
FIG. 3 graphically illustrates an example of typical error in angle of attack using the Simple Method, FIG. 4 graphically illustrates an example of typical error in sideslip angle calculation using the Simple Method.
Figure 4:
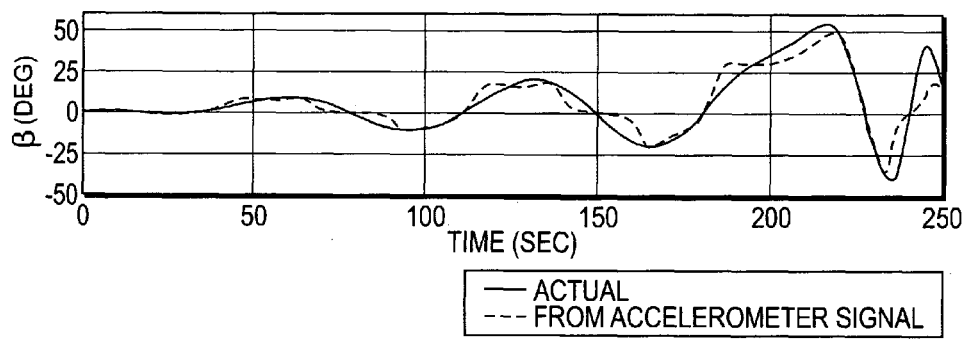

Once the rates have been damped, the vehicle can be maneuvered to the heat shield forward attitude ($\alpha_{ac}$, $\beta_{ac}$)=(0, 0). Due to the effect of the aerodynamic forces acting on the vehicle, the velocity vector and the negative acceleration vector do not necessarily coincide, thus, with the exception of the roll angle (the roll angle $\eta_{ac}$, as opposed to the other two, is equal to $\eta$, the actual one), an angular error will exist between the actual aerodynamic angles and the aerodynamic angles calculated directly from the 3-axis accelerometer. FIGS. 3 and 4 illustrate the actual angles of attack and sideslip and the angles of attack and sideslip generated by the Simple Method.

Figure 5:
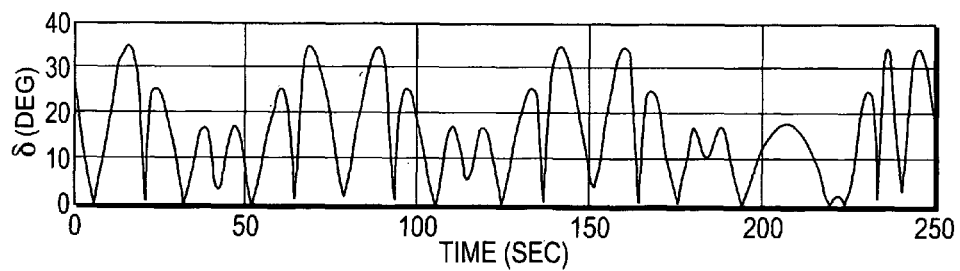
FIG. 5 graphically illustrates $\delta$, the angle between the minus acceleration vector (−a) and the velocity vector (V) of FIG. 2, against the same time line as FIGS. 3 and 4.

The angles of attack and sideslip generated from the acceleration signals ($\alpha_{ac}$ and $\beta_{ac}$) follow the actual aerodynamic angles ($\alpha$ and $\beta$) with a non-constant angular error. This means that there will be an error angular distance between the velocity vector and the minus acceleration vector. This error is denoted by $\delta$ in FIG. 2. The timeline of $\delta$ is shown in FIG. 5. However, note from eq. 2 that as the spacecraft maneuvers to the heat shield forward attitude ($\alpha_{ac}$,$\beta_{ac}$)=(0,0), the components y and z of the acceleration become zero. This means that as ($\alpha_{ac}$,$\beta_{ac}$) becomes (0,0), the error $\delta$ becomes zero as well; therefore, at ($\alpha_{ac}$,$\beta_{ac}$)=(0,0) the spacecraft will actually be at the desired ($\alpha$,$\beta$)=(0,0).

Once the spacecraft is maneuvered to the heat shield forward attitude ($\alpha_{ac}$,$\beta_{ac}$)=(0,0), the subsequent aerodynamic moments will orient the spacecraft to the trim attitude ($\alpha$,$\beta$) =($\alpha_{trim}$, 0). That is, the spacecraft will passively orient itself (without the need of a reaction control system) to the trim attitude thanks to the action of the aerodynamic moments.

Once the spacecraft reaches the trim attitude (or is close to it) the ballistic rate can be imparted. Whereas the ballistic rate can be imparted before the spacecraft is oriented to the trim attitude, imparting the ballistic rate at the trim attitude minimizes the amplitude of the induced oscillations during entry.

Trim Method

In the Trim Method, the goal is to be able to determine $\alpha$ and $\beta$ with a smaller $\delta$ error, so the spacecraft can be maneuvered directly to the trim attitude.

To develop the trim method, the following system of equations is considered:

$$a_x = f(S_{ref}, m, q_{bar}) C_A(\alpha_T)$$

$$-a_y = f(S_{ref}, m, q_{bar}) C_N(\alpha_T) \sin \eta$$

$$-a_z = f(S_{ref}, m, q_{bar}) C_N(\alpha_T) \cos \eta \quad \text{Eq. 3}$$

where $C_A$ and $C_N$ are the axial and normal force coefficients, respectively, $\alpha_T$ is the total angle of attack and f is a function of the reference surface ($S_{ref}$), mass of the spacecraft (m) and the dynamic pressure ($q_{bar}$).

In Eq. 3, note that the function f holds the same value in all components. In reality, the values of the normal and axial force coefficients depend on the total angle of attack and on the Mach number. However, for hypersonic Mach numbers, both coefficients remain basically constant, thus, only the dependence on the total angle of attack needs to be accounted for. Note that during the atmospheric entry, the maximum heat rate and maximum dynamic pressure take place at hypersonic Mach numbers.

From eq. 3, dividing the expression of $-a_y$ by that of $-a_z$ results in the definition of the actual roll angle in terms of the acceleration components $\eta = \tan^{-1}(-a_y/-a_z)$ which means that $\eta_{ac}$ in eq. 2 is equal to the actual $\eta$. Therefore, the roll angle in both the Simple and the Trim methods can be calculated exactly from the components of the sensed acceleration.

To obtain the remaining aerodynamic angles ($\alpha$ and $\beta$), the aerodynamic characteristic of the spacecraft is taken into account through the normal and axial force aerodynamic coefficients, $C_N$ and $C_A$. These coefficients are part of the so called 'aerodynamic data base' of the spacecraft. The generation of this data base is part of the design process of the spacecraft and is available before the mission.

From eq. 3, dividing the expression of $-a_y$ by that of $a_x$ results in $$(C_N/C_A)(\alpha_T) = \frac{-a_y}{a_x \sin \eta} \quad \text{Eq. 4}$$

Figure 6:
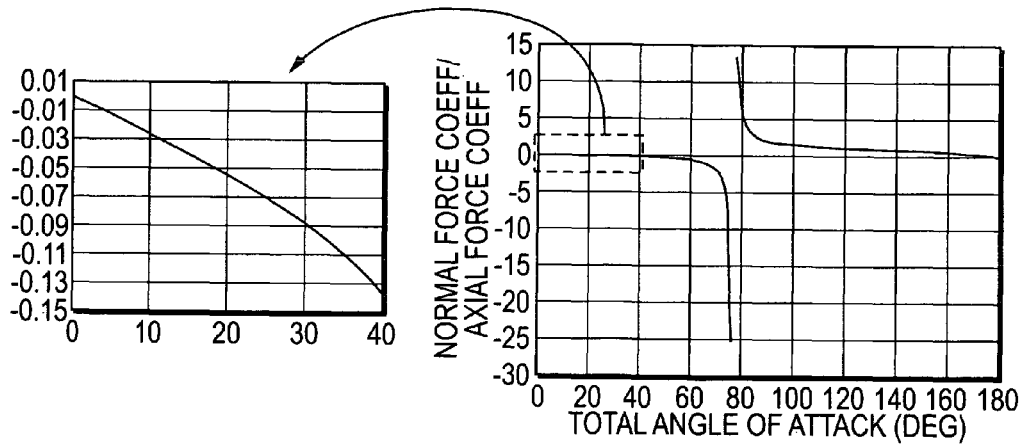
FIG. 6 graphically illustrates a typical plot of $C_N/C_A$ against total angle of attack for a blunt capsule type spacecraft which shows that $C_N/C_A$ is a one to one function with the total angle of attack. This figure also illustrates that $C_N/C_A$ is a one to one function with the total angle of attack for small angles.

Therefore, the ratio $C_N/C_A$ as a function of $\alpha_T$ can be calculated directly from the acceleration signals provided by the 3-axis accelerometer. By mathematically correlating the value of $-a_y/(a_x \sin \eta)$ with the predetermined values for $C_N/C_A$, the value of $\alpha_T$ can be obtained. Note that $C_N/C_A$ is a one to one function with the total angle of attack (see FIG. 6).

Once $\eta$ and $\alpha_T$ are known, the aerodynamic angles $\alpha$ and $\beta$ can be computed using Eq. 5

$$\alpha_{ac} = \tan^{-1}(\cos \eta \tan \alpha_T)$$

$$\beta_{ac} = \sin^{-1}(\sin \eta \sin \alpha_T) \quad \text{Eq. 5}$$

Note that the angles can be differentiated if desired to provide angular rates, allowing the damping of rates by the reaction control system.

Once the rates have been damped and the vehicle has been maneuvered to the trim attitude the ballistic rate can be imparted.

Figure 7:
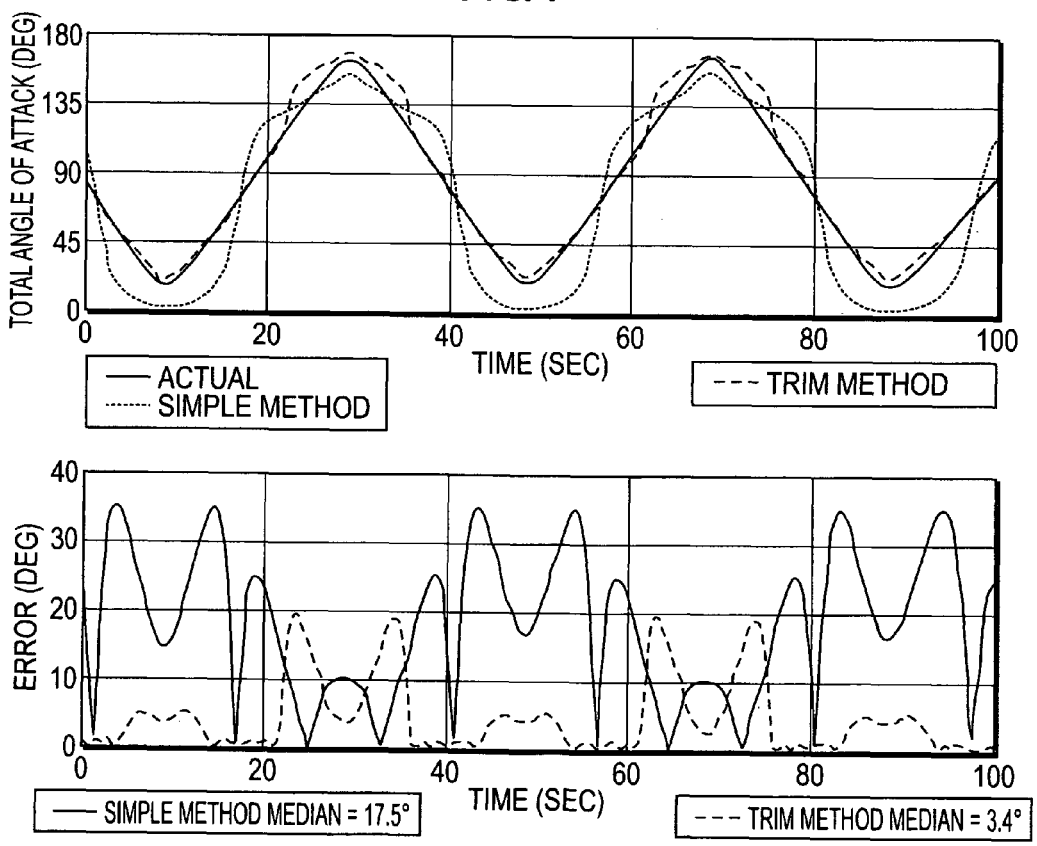
FIG. 7 shows an example that compares the actual total angle of attack to the total angle of attack obtained from the Simple Method and from the Trim Method. This figure also shows the error signal when both total angles of attack are compared to the actual total angle of attack.

FIG. 7 shows an example that graphically compares the actual total angle of attack to the total angle of attack obtained from the Simple Method and from the Trim Method. Note that the source for error in the Trim Method in this particular example is solely coming from how accurate is the internal model of the ratio $C_N/C_A$. In the case represented in FIG. 7, the internal model was deliberately not exactly equal to the actual $C_N/C_A$. The coefficients $C_N$ and $C_A$ were approached by a Fourier series of order 5. For this particular example, the median error produced by the Simple Method is 17.5 degrees, while the median error produced by the Trim Method is 3.4 degrees.

The required resolution of the 3-axis accelerometer is influenced by the thrust capability of the reaction control system available, on the type of entry (low Earth orbit or Lunar return), and on the desired accuracy for $\alpha$ and $\beta$. Also the attitude accuracy of the aerodynamic angles attained will depend on the resolution of the accelerometer and on the fidelity of the internal $C_N/C_A$ model.

Figure 8:
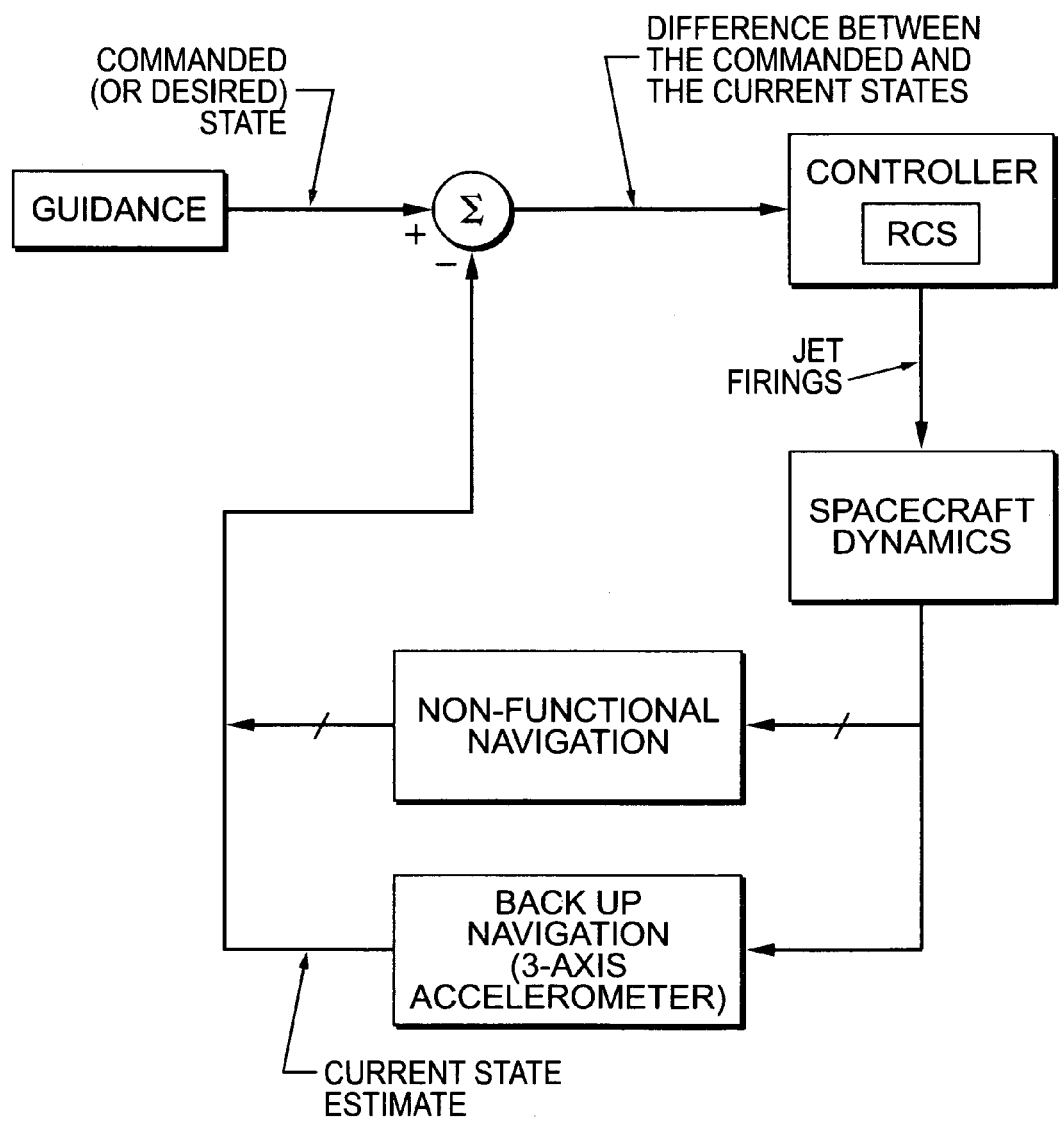
FIG. 8 is a schematically illustrates carrying out an embodiment of the invention.

In FIG. 8, the navigation system senses the physical aerodynamic acceleration experienced by the spacecraft. In the absence of a functional navigation system, the backup navigation system takes over. The algorithms proposed and described elsewhere herein are contained in the backup navigation system. This system estimates the current state (attitude and attitude rate). The current state is output and compared (subtracted) to the state commanded by the guidance. The commanded state coming from the guidance system is either a zero attitude rate if the spacecraft is tumbling, or the heat-shield forward or the trim attitude if the spacecraft is not tumbling. The difference between the commanded and the estimated states is input to the control system. The reaction control jets fire accordingly to try to match the current state with the desired state. Firing the jets affects the attitude and attitude rate of the spacecraft which implies that a new set of aerodynamic accelerations will be experienced by the spacecraft. Those are in turn sensed by the backup navigation system and the cycle starts again. After each cycle, the current state will be closer to the commanded state. After a number of cycles, both will match. At that moment, the difference between the commanded and the current states will be zero, which means that the controller will receive no signal, thus, no firing will take place. Firings will subsequently take place only to correct the state if it deviates from the commanded one.

While certain preferred embodiments of the invention have been described herein, the invention is not to be construed as being so limited, except to the extent that such limitations are found in the claims.

What is claimed is:

1. A method for orienting a blunt heat shield capsule-type spacecraft for an emergency ballistic atmospheric entry, said method comprising
   a) determining if the spacecraft is tumbling and, if so, canceling the attitude rate contributing to the tumbling to prevent the spacecraft from entering the atmosphere in an adverse attitude; and then
   b) maneuvering the spacecraft to a trim attitude or to a desired attitude, in terms of the aerodynamic angles, for heat-shield forward pointing so that the heat shield faces incoming airflow to counteract heat rate buildup inside the spacecraft; and then c) imparting a bank or roll rate to the spacecraft to null the average lift vector in order to prevent excessive deceleration loads on the crew,
wherein
spacecraft attitude and change of attitude information for conducting steps a), b), and c) are determined in an on-board computer by processing signals from a three-axis accelerometer system on board the spacecraft.

2. A method as in claim 1 further comprising
determining the acceleration vector of the spacecraft and each component of the acceleration vector utilizing signals from a three-axis accelerometer system on the spacecraft comprising three sensors having mutually orthogonally oriented axes, and providing acceleration signals in each of its axes, and
exerting attitude and attitude rate control on the spacecraft with a system comprising a set of jets on the spacecraft oriented to provide control capacity in three mutually orthogonally oriented axes which may be the same as or different from the sensor axes.

3. A method as in claim 2 wherein the step of determining the attitude further comprises calculating, by use of a computer processor executing a method algorithm on the acceleration signals, values for aerodynamic angles of attack, sideslip and roll.

4. A method as in claim 3 wherein the computer processor calculates the aerodynamic angles by executing a method algorithm selected from the group consisting of
a) a Simple Method algorithm, and
b) a Trim Method algorithm,
said method further comprising differentiating the angles to provide angular rates, and employing the angular rates to damp the spacecraft.

5. A method as in claim 4 wherein algorithm a) further comprises calculating the angular values from $$\alpha_{ac} = \tan^{-1}\left(\frac{-a_z}{-a_x}\right), \beta_{ac} = \sin^{-1}\left(\frac{-a_y}{\|\vec{a}\|}\right), \eta_{ac} = \tan^{-1}\left(\frac{-a_y}{-a_z}\right)$$

where $\alpha_{ac}$, $\beta_{ac}$ and $\eta_{ac}$ are the angles of attack, sideslip and roll calculated from acceleration signals $-a_x$, $-a_y$, and $-a_z$ provided by the 3-axis accelerometer.

6. A method as in claim 4 wherein algorithm b) further comprises
calculating, from the acceleration signals $-a_x$, $-a_y$, and $-a_z$ provided by the 3-axis accelerometer, a value for $$-a_y/(a_x \sin \eta),$$

wherein the roll angle $\eta$ is given by the relationship $$\eta = \tan^{-1}\left(\frac{-a_y}{-a_z}\right).$$

7. A method as in claim 6 further comprising
determining $\alpha_T$, by accessing, or alternatively by calculating from predetermined values, a value for a ratio $C_N/C_A$, wherein $C_N$ and $C_A$ are the normal and axial force aerodynamic coefficients of the spacecraft, at different total angles of attack.

8. A method as in claim 7 further comprising
obtaining the value for the total angle of attack $\alpha_T$ from the relationship $$(C_N/C_A)(\alpha_T) = \frac{-a_y}{a_x \sin \eta}.$$

9. A method as in claim 8 further comprising
computing aerodynamic angles of attack and sideslip from the relationships $$\alpha_{ac} = \tan^{-1}(\cos \eta \tan \alpha_T)$$

$$\beta_{ac} = \sin^{-1}(\sin \eta \sin \alpha_T)$$

and the previously obtained values for $\alpha_T$ and $\eta$.

* * * * *